(12) United States Patent
Dominique (10) Patent No.: US 6,322,178 B1
(45) Date of Patent: Nov. 27, 2001

(54) RACK MOUNTED FIBER OPTIC WORKSTATION

(75) Inventor: Jeffrey Michael Dominique, Tempe, AZ (US)

(73) Assignee: John Wolfe, Mesa, AZ (US)

( * ) Notice: Subject to any disclaimer, the term of this patent is extended or adjusted under 35 U.S.C. 154(b) by 0 days.

(21) Appl. No.: 09/455,890

(22) Filed: Dec. 6, 1999

(51) Int. Cl.$^7$ ........................................... A47B 5/02
(52) U.S. Cl. .................. 312/330.1; 312/244; 312/334.4; 108/108; 108/147.17; 248/244
(58) Field of Search ............... 108/144.11, 147.11, 108/147.12, 147.15, 147.17, 147.21, 106, 107, 108, 25, 26, 180; 312/205, 333, 334.47, 334.4, 334.5, 223.1, 244, 330.1; 248/201, 244, 298.1, 222.41; 211/700.06

(56) References Cited

U.S. PATENT DOCUMENTS

| | | | |
|---|---|---|---|
| 1,288,010 | * 12/1918 | Isaac | 108/147.17 X |
| 4,416,372 | * 11/1983 | Polk | 312/902 X |
| 5,114,007 | * 5/1992 | Chen | 312/902 X |
| 5,655,740 | * 8/1997 | Lazarus | 108/108 X |
| 6,116,163 | * 9/2000 | Mitchell | 248/244 X |

* cited by examiner

Primary Examiner—Peter M. Cuomo
Assistant Examiner—Michael J. Fisher (57) ABSTRACT

The portable workstation includes a frame having an adjustable mounting mechanism, which permits the case to be mounted on a variety of telecommunication equipment racks and other field structures. When mounted on the rack, the workstation provides a horizontal surface for working on fiber optic cables or other telecommunication equipment. A smooth, clean surface for working on fiber optic cables is an essential requirement for users of the workstation. The workstation includes a drawer for storing tools, instruments, and supplies required for working on fiber optic cables or copper wire. The drawer slides in and out of the frame when the workstation is mounted on the rack to provide convenient access to the contents. The frame of the workstation is formed from extruded metal and includes an internal channel for the drawer and an external channel for securing the adjustable mounting bars. The bars are adjustable to accommodate the various rack or other mounting configurations used in the telecommunication and other industries.

16 Claims, 5 Drawing Sheets

RACK MOUNTED FIBER OPTIC WORKSTATION

BACKGROUND OF THE INVENTION

Field of the Invention

The present invention relates to a portable workstation for rack mounting, and more particularly, to a workstation for field use when servicing fiber optic telecommunications equipment. The workstation includes a special mounting fixture which provides a means for mounting the workstation on a fiber optic telecommunications rack, ladder, pedestal, or other stationary field stand. The workstation includes a storage area for tools and supplies, and a clean work surface for working on the fiber optic and related communications equipment.

SUMMARY OF RELATED ART

Fiber optic technology is the transmission of energy by light through glass fibers, and is used to transmit and receive analog and digital signals. Fiber optic cable is the premier medium to meet the demand for higher speeds and greater information carrying capacity. Telephone, cable television, communication companies, and other businesses around the world are investing billions of dollars in fiber optic lines which have an enormous capacity for carrying data. Because of the advantages of fiber optic systems over conventional electrical and electronic components and systems, significant growth and expansion is anticipated in the use of fiber optic systems.

One of the main advantages of the fiber optic system is the ultra clear and clean signals in such system. Fiber optic systems are non-conductive, and are not effected by interference from radio frequency or electromagnetic fields. The losses associated with the transmission of fiber optic signals are significantly less than the losses in an electrical system. Another major benefit of a fiber optic system is the greater information carrying capacity. The fiber optic cable is significantly smaller and lighter in weight than the comparable copper conductors required for equivalent transmission capabilities. Optical data is transmitted through fiber optic cable at speeds up to 100 times faster than data transmitted using copper wire.

A typical fiber optic system consists of a transmitter, a transmission medium, and a receiver. The transmission medium is a fiber optic cable which includes a core made from extremely pure glass drawn out into a fine strand that is strong and flexible. The fiber optic cable also requires an outer sheath or cladding formed around the highly transparent core of glass that carries the light. The cladding reflects light back into the core such that the light is propagated by internal refraction. Fiber optic cable is classified by transmission type (single mode, graded index multimode, etc.) and by core/cladding diameter (i.e. 62.5/125 microns).

The single mode fiber only propagates one mode of light which makes it highly efficient. This type of cable is used with laser sources and requires an exact coupling alignment to a well-defined beam of light. The graded index multimode fiber exhibits a variable core density cross-section, which reduces intermodal dispersion and acts to focus broader bandwidths of reflected light into the fiber's core. Precision alignment of splices and connections are also essential in the graded index multimode fiber.

The single mode and/or multiple mode fibers can be assembled into multi-fiber bundles with a single outer cover. The bundles may include a central strength member for additional strength during installation. The bundle is designed to facilitate the splitting out of individual fibers for connection purposes.

The core size may be as small as 10 microns in diameter for a single mode fiber and as large as 85 microns for a multiple mode fiber. When the cladding is included, the total diameter for a single mode fiber can range up to 125 microns. The single mode fiber is very efficient at transmitting light, but such fiber has a small numerical aperture and is not effective in gathering light. Consequently, the single mode fiber is generally used for long distance applications with laser light transmitters, which can provide a concentrated beam of light. The multiple mode fiber has a much larger numerical aperture, but is less efficient at transmitting the light. The multiple mode fibers are used with light emitting diodes with a broader light wave for more local applications (50 miles or less). The diameter for multi mode fibers ranges from 125 microns to 400 microns.

In fiber optic systems, engineers and technicians perform power budget calculations to determine original and periodic operational system integrity in regard to attenuation. The transmitter spectral output power and receiver maximum sensing range are compared to the system losses in the fiber, connectors, splices, and couplers. The transmitter and receiver must be sized to ensure power to propagate the signal from the source to the receiver.

The total attenuation is significantly affected by the quality of the connections and/or splices in the fiber optic system. The losses at a dirty or poor quality connection can easily increase losses in the fiber optic system by as much as ten times the projected amount for a high quality connection. Poor quality connections are the most frequent cause of power loss, which results in operating defects and breakdowns in the fiber optic system.

Each fiber optic system will have optical connections at each junction between a fiber optic cable and a light source or detector. Connections are also needed to join or splice together the ends of two cables. Since each fiber optic system will include a number of junctions of fiber optic cable, it is essential that the technicians working on fiber optic cables in the field have a clean and convenient surface for properly connecting the fiber optic cables.

In the installation of a fiber optic system, transmitters and receivers may be positioned throughout the system at the desired locations for transmitting and receiving signals. The transmitters and receivers are mounted in a light interface unit which includes both electrical receptacles for input/output of electrical signals and lighting receptacles for the input/output of light signals. After the light interface units with transmitters and receivers have been installed and the cable between the light interface units pulled, one of the final field steps to complete the installation is connectorization, which is the connection of fiber optic connectors to the ends of the fiber optic cables to facilitate the proper alignment of the core of the fiber optic cable at the fiber optic connections.

The fiber optic cables used in a system will have a connector secured to each end of the fiber optic cable, the connector being designed for insertion and locking in the receptacle. The cable is stored on spools and is pulled from the spools in the field during installation. Several different types of receptacles and connectors are available for use in fiber optic systems.

The connectorization will typically occur at a telecommunications rack. The racks come in various sizes, but the two standard widths for such racks are 19 inches and 23 inches. The light interface units and the other components in the system are mounted on the rack. The racks are frequently mounted in a storage area or other enclosed facility where space is at a premium.

The connectors are usually installed on the fiber optic cable in the field at the time of installation. The fiber optic cable is stripped of its protective covering and the glass core and cladding are inserted into the connector such that the glass core extends from the ferrule at the end of the connector. The cable is epoxied into the connector and the glass core at the end of the ferrule is cleaved and polished using a lapping process.

The polished end of the core of the cable must be inspected to ensure that the end surface is clean and scratch free. Any scratches or cracks in the end of the glass fiber will adversely effect the integrity of the connection. Even body oils, lint or dust can cause unacceptable losses at the connection.

Because a good connection is essential to the overall efficiency of the system, a technician working on fiber optic connections requires a clean and convenient workstation for use in the field. The technician in the field must be able to inspect the end of the core of the fiber optic cable to ensure a smooth and clean surface for transmission of the light. The technician must have a place to rest his tools and materials when attaching the connectors to the fiber optic cable, which typically requires a clean, flat surface to work upon. A clean and convenient place to store tools and work materials is also desired by the technician.

As the application of fiber optic systems for business and personal use has increased, the demand for technicians to install and service the systems has not kept pace. In addition, there is a critical need for tools and supplies which are suited for use by technicians in the installation and servicing of the fiber optic systems.

One of the problems in field work is obtaining a clean, flat work surface to work on the fiber optic cable. The areas where telecommunication racks are located do not usually have a work surface available for the technician. Because a clean work area is important to achieving a proper fiber optic connection, technicians prefer using their own workstation. But positioning a workstation at a convenient height for performing service work is typically a problem. Technicians cannot carry a full size station and in most field locations, there are no tables or flat surfaces available for positioning a portable workstation at the desired height.

Another important consideration for technicians in the field is the convenience in transporting the workstation. Technicians need a workstation which includes the capability of carrying their tools, work supplies, and a work surface all at one time to minimize the need to make additional trips to carry such items to the site where the work is performed.

SUMMARY OF THE INVENTION

In accordance with the present invention, there is provided a portable workstation that can be mounted on a telecommunications rack, ladder, pedestal, or other stationary field stand to provide a sturdy, horizontal work surface and tool storage area. The workstation is ideally suited for use in field inspection and work on fiber optic components, copper wire, and other electronic components.

A technician working on copper wired systems primary need is for a tool box with supplies and tools to perform necessary services in the field. In addition, a technician working on fiber optic systems needs not only supplies and tools, but also a clean working surface to clean and polish the fiber optic cables and to perform the connections required in a fiber optic system. The portable workstation of the present invention provides a technician with an easy to carry combination unit that provides both a tool box for tools and supplies, and a work surface for performing the services in the field. By adjusting the mounting mechanism, the workstation is mounted on the fiber optic rack such that the work surface is horizontal for convenient use. A clamp-like bracket may also be provided which enables a technician to clamp the workstation onto ladders, pedestals, and any other stationary field stand.

The workstation is formed from a U-shaped, extruded frame. The frame may be made by forming a single length of extruded metal or by welding individual frame members together. The frame includes an internal channel which forms a mounting track for a drawer. The drawer is inserted into the channel at the open side of the U-shaped frame. The drawer slidingly engages the channel such that the drawer is moveable between a closed position inside the frame and an open position extending from the frame. In order to carry the portable workstation, the drawer can be secured in the closed position to permit transport of the workstation.

Tools, supplies, instruments, and other items are stored in the drawer. The standard size drawer fits totally within the frame of the workstation. Larger size drawers may also be used in which the drawers are deeper and extend from the frame opposite the cover. A layer of foam with cutouts may be positioned inside the drawer to store and protect the tools and instruments. Mutiple layers of foam inserts may be used to provide additional storage area.

The workstation also includes an adjustable mounting mechanism to secure the workstation to the telecommunication racks. The mounting mechanism is adjustable so that the workstation can be used on mounting racks, ladders, pedestals, and other stationary field devices of varying widths. The U-shaped frame includes an external channel, and mounting bars may be inserted in the channel of the frame. The position of the bars can be adjusted within the channel so that the mounting mechanism is aligned for mounting on the rack. The bars are typically inserted at opposite ends of the external channel of the cross member of the frame, which extends between the two side members of the frame. The mounting bars have a mounting hole situated in a biased forty-five degree angle from a vertical position. The mounting holes are used to mount the workstation on mounting bolts extending from the rack.

The bars may also be configured for securing the workstation to field devices, such as ladders, pedestals, and other stationary field stands. A set of vice-type threaded cinching knobs and mounting bars are used for such mounting configuration. Different positioning and configurations of the end members can be used to mount the workstation on a majority of rack and other structures used in the communications industry and other similar applications.

A cover is mounted on the frame adjacent the open side of the drawer. The cover is secured to the frame and is positioned over the contents of the drawer when the drawer is in the closed position. The cover has a flat, hard outer surface which serves as a work area when the workstation is mounted on the rack. The cover is designed to be scratch resistant and easy to clean. The smooth outer surface does not retain oil or dust or other contaminants which my come in contact with the surface during use or when in transport or storage.

All of the mounting configurations are arranged such that the outer surface of the cover provides a horizontal work surface for a technician to work on fiber optic and other communication systems deployed on the rack. The workstation can be mounted on the rack at the height most suitable for performing the service work.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
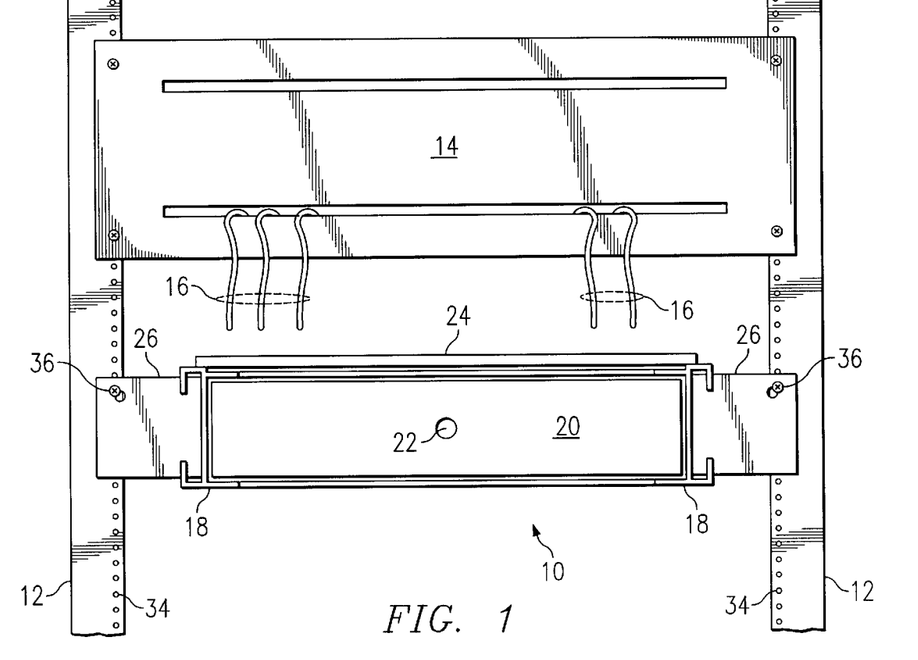
FIG. 1 is front elevational view of a portable workstation mounted on a telecommunications rack, including adjustable mounting bars for securing the workstation to the rack.
Figure 2:
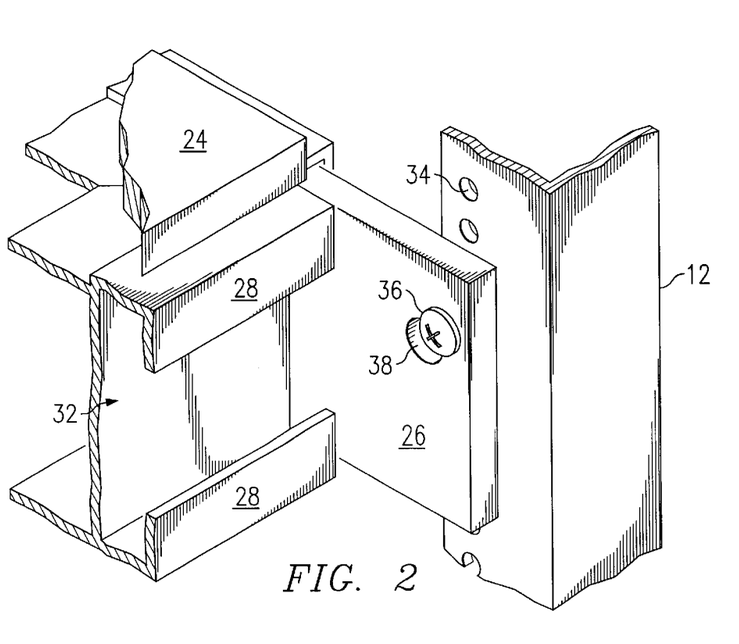
FIG. 2 is a perspective view of an adjustable mounting bar extending from the workstation and mounted on a bolt in the rack.
Figure 3:
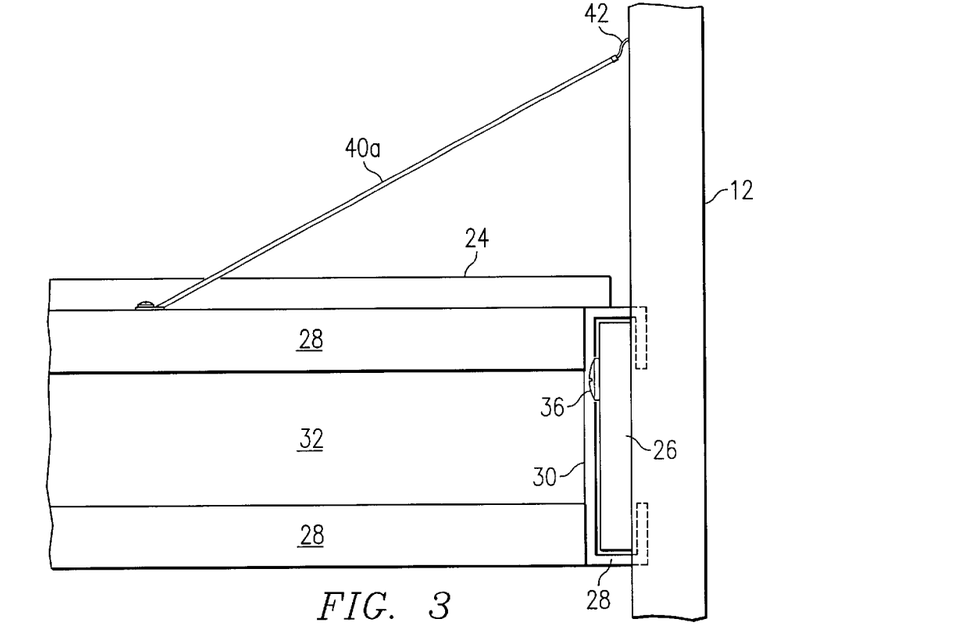
FIG. 3. is a side elevational view of the workstation mounted on a telecommunications rack.

Referring now to FIGS. 1–3, a portable workstation 10 of the present invention is mounted on a fiber optic rack 12. The rack 12 also includes a fiber optic patch or connection panel 14 having fiber optic cables 16 which require cleaning and connection to the terminals of the fiber optic patch panel 14.

The workstation 10 includes a U-shaped frame 18 having a drawer 20 positioned within the frame 18. The drawer 20 may be slid out of and then back into the frame 18 to provide access to the contents of the drawer 20. A hole 22 may be drilled in the side of the drawer 20 to provide a means for opening and closing the drawer. Other handle mechanisms are also acceptable for opening and closing the drawer 20.

A cover 24 is secured to the edge of the frame 18 and provides a horizontal work surface for working on the fiber optic cables. The type of work performed on the fiber optic cables 16 is described in my pending application Ser. No. 09/361,703 and my U.S. Pat. Nos. 5,982,533 and 5,731,893, which material is incorporated herein by reference.

Figure 11:
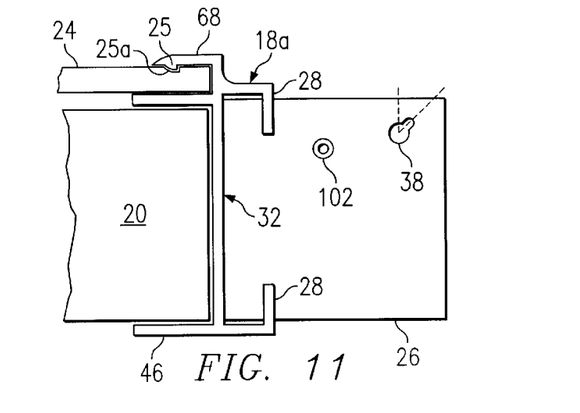
FIG. 11 is a front end view of side member of a frame with the alternative extrusion, with the partial cover, drawer, and mounting bar also shown.

The cover 24 may be secured to the frame 18 in a number of different ways. The cover 24 may be glued or epoxied to the frame 18. Clips or other fasteners may be used to secure the cover 24 to the frame 18. The U-shaped frame 18 may be provided with a separate groove or channel extending around the upper edge of the frame 18, such channel facilitating the insertion and retention of the cover 18 in the channel (FIG. 11). The cover 24 is preferably made from PVC or other similar material. The PVC cover 24 is easy to keep clean and is very durable in field environments. A smooth, clean working surface is very important when working with fiber optic cables 16. The PVC cover does not absorb oils or other contaminants which may come in contact with the cover 24.

Mounting bars 26 are adjustably secured to the frame 18. The frame 18 includes an external channel 28 to retain the bars 26 and the bars can be slid along the channel to accommodate various widths of the rack 12. The standard fiber optic telecommunication racks are typically 19 inches or 24 inches in width. By sliding the bars 26 in the channel 28, the bars 26 can be positioned for mounting on racks of varying width. The external channel 28 is typically required only on the back surface of the frame 18 along the cross member 30. However, to simplify the manufacturing process, the same frame member configuration is used for both the cross member 30 along the bottom of the U-shaped frame 18 and the two side members 32 of the frame 18. The external channel 28 is the same for both the cross member 30 and the side members 32.

The rack 12 includes a column of pre-drilled and tapped holes 34. All racks in the telecommunications industry have the same hole size and pattern. To secure the workstation 10 to the rack 12, a screw 36 is secured on each side of the rack 12 in holes 34 at the same height. The mounting bars 26 include a forty-five degree angle biased key hole 38. Instead of having the key hole with the narrow portion aligned vertically above the wider opening, the keyhole is formed at a forty-five degree offset from the typical vertical configuration. The purpose of the forty-five degree angle biased key hole 38 is to cause the bars 26 to slide inward when the workstation 10 is mounted on screws 36 of the rack 12, which promotes a more secure locked-in position for the bars 26 in the external channels 28. The mounting bars 26 are adjusted in the external channels 28 until the key holes 38 are aligned with and then positioned on the screws 36 in the rack 12.

Figure 9:
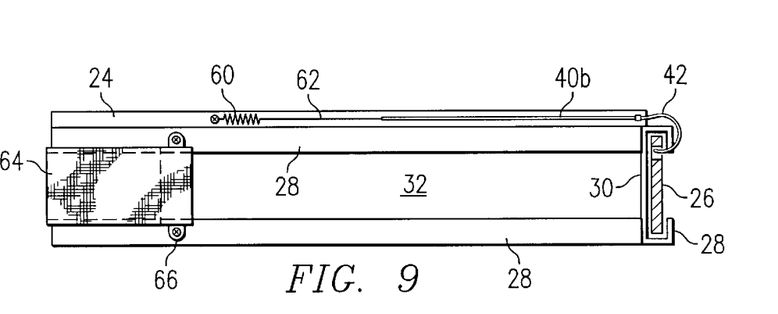
FIG. 9 and FIG. 9A are side views of alternative workstation configurations.

In FIG. 3 and FIG. 9, an optional support line 40a, 40b is shown which may be used to steady the workstation 10 when mounted on the rack 12, and may also be used to retain the bars 26 in the external channels 28 when the workstation is not mounted on the rack 12. The support line may be made of elastic material 40a (FIG. 3), may be a spring loaded wire 40b (FIG. 9), or other similar line which has some elasticity. The support line 40a has one end secured to a side member 32 of the frame 18. The other end of the support line has a hook 42. The support line 40a can be secured in hole 34 of the rack to provide additional stability to the workstation 10 (FIG. 3). The mounting bars 26 by themselves are sufficient to secure the workstation 10, and such a mounting configuration can support up to one hundred pounds. The support line 40b is also used as a means for securing the mounting bars 26 in the external channel 28 when not mounted on the rack 12 (FIG. 9). The hook 42 is hooked in the key whole 38 to prevent the bars 26 from sliding out of the channel.

Other support mechanisms could be used to support the workstation 10 when mounted, and other fasteners or locking mechanisms could be used to secure the bars 26 in the external channels 28 when being transported. For example, telescoping legs could be pivotably mounted on the side members 32 and secured along the side members 32 when not in use. When required, the telescoping legs could be pivoted and extended to support the workstation 10 engaging the rack 12 or the ground.

Figure 4:
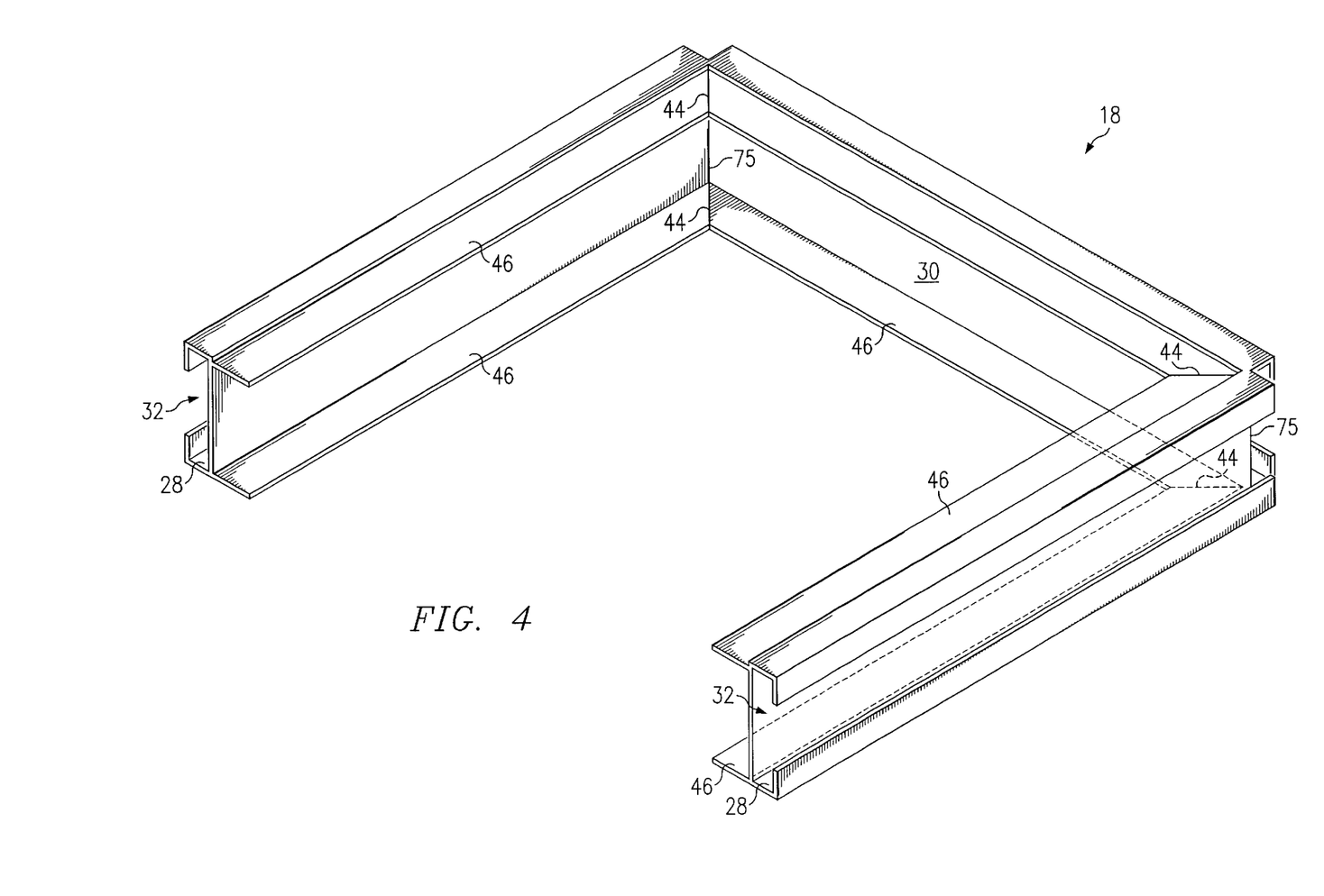
FIG. 4 is a perspective view of the frame of the workstation.

One embodiment of the frame 18 is shown in FIG. 4. The U-shaped frame as two side members 32 and a cross member 30. The corners 44 are welded along the edges of the miter joint formed by at the junction of the cross member 30 and the side members 32. In addition to the external channel 28, the frame 18 includes an internal channel 46 to receive and support the drawer 20. The drawer 20 slides in the internal channel 46 between a closed position when fully inserted in the channel 46 and an open position when the drawer 20 is extended from the frame 18.

Figures 5, 5A:
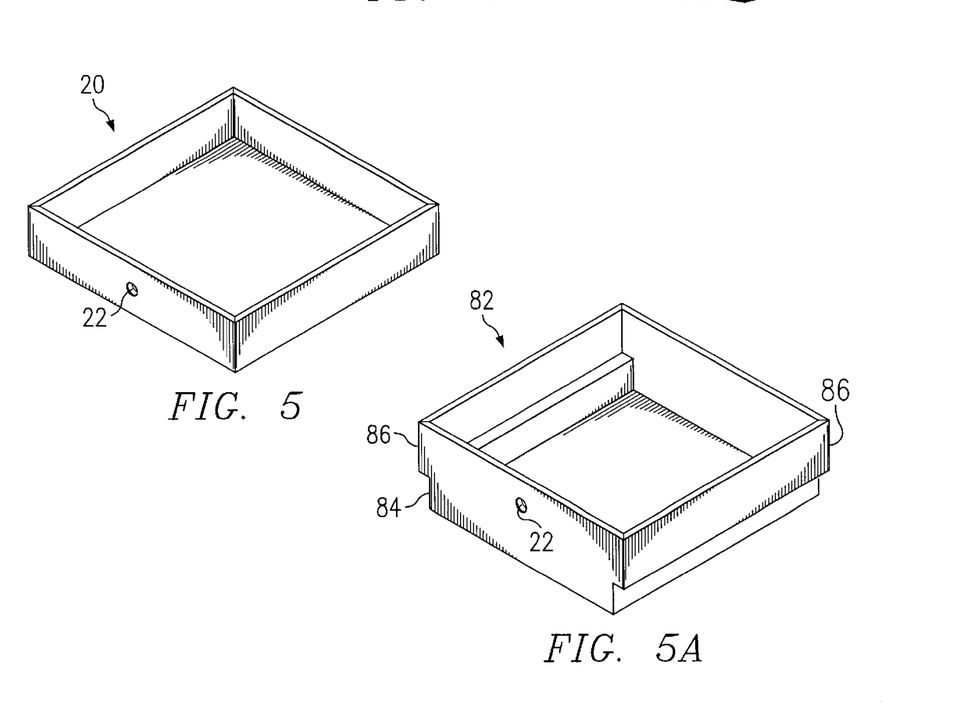
FIG. 5 is a perspective view of the drawer which is positioned in the frame of the workstation.
FIG. 5A is front elevational view of an alternative drawer configuration with an extended storage area.

The rectangular drawer 20 shown in FIG. 5 is a basic drawer made from composite material, wood, or other suitable material. Using a hole 22 to open and close the drawer 20 keeps a flat surface along the outer edge of the drawer 20. Other mechanism would also be suitable for opening devices. The drawer 20 and frame 18 are typically 14–16 inches wide, 12–15 inches deep, and 2.5–3.5 inches in height. The frame 18 is typically made from an extrudable metal, such as aluminum. The frame 18 is preferably extruded to facilitate the forming of the external channel 28 and the internal channel 46.

FIG. 5A shows an alternative configuration for the drawer in which a bottom segment 84 of the alternative drawer 82 is extended to provided additional height to the drawer for added storage capacity. The sides 86 of the alternative drawer 82 are maintained in the same configuration to ensure proper mounting of the alternative drawer 82 in the frame 18. The height of the alternative drawer 82 is typically 3–4 inches.

Figure 6:
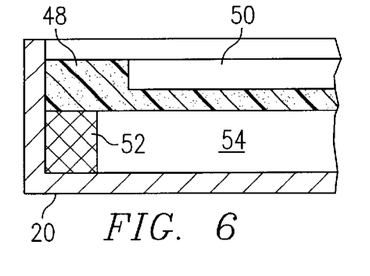
FIG. 6 is a partial cross-sectional view of the drawer with a foam insert in the drawer.
Figure 7:
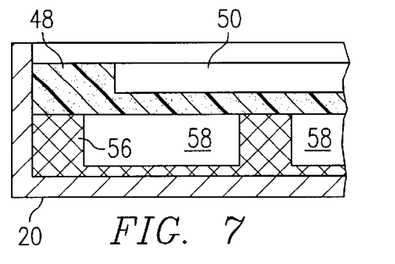
FIG. 7 is a partial cross-sectional view of the drawer with two foam inserts to provide an additional storage area.

FIGS. 6–7 show how foam inserts can be used inside the drawer 20 to secure and protect tools, instruments, and supplies. In FIG. 6, a single foam layer insert 48 is secured on a shelf board 49 and positioned within the drawer 20. The foam layer insert 48 includes cutouts 50 to form storage areas for tools and instruments. The foam insert 48 is supported on spacers 52, which supports the insert 48 above the base of the drawer 20 to form an additional storage area 54 for documents, supplies, and other items carried in the workstation 10. The shelf board 49 with foam insert 48 rests on the spacers 52 and can be easily lifted to gain access to the additional storage area 54. FIG. 7 shows a drawer 20 having a second foam layer insert 56 positioned beneath the shelf board 49 of the first foam insert 48. Storage areas 58 may also be formed in the second foam insert 56.

Figure 8:
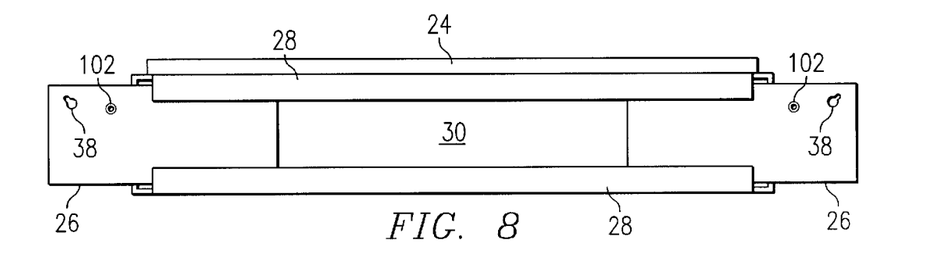
FIG. 8 is a back view of the workstation showing the mounting bars in the channel of the frame.

The positioning of the mounting bars 26 in the external channel 38 of the cross member 30 is shown in FIG. 8. The bars 26 can be positioned in the channel 28 until the keyhole 38 is aligned with the screws 36 on the rack 12. The retention means, such as the support line 40b (FIG. 9), can be used to retain the bars 26 in the channel 28. The bars 26 are made from aluminum or other suitable metal. The height of the bars 26 is approximately 2 inches and the bars can have a length of 6–8 inches.

FIG. 9 shows the support line 40b with a spring 60 and a wire extension 62. The support line 40b can be mounted in several different locations along the side member 32. The support line could be mounted in the channel 28 and extend through a hole in the top of the channel 28. The support line 40b could also be mounted on the outer surface of the side member 32 adjacent the cover 24.

FIG. 9 also shows a handle mechanism formed by an elastic, nylon, or canvas strap 64 secured to the frame by clip 66. When the workstation is not mounted on the rack 12, the strap 64 is positioned around the end of the side member 32 and engages the side of the drawer 20 to retain the drawer in a closed position (FIG. 9). When the workstation 10 is mounted on the rack 12, the strap 64 can be positioned about the bottom edge of the side members 32 of the frame 18 opposite the cover 24 so that the drawer 20 can be moved to the open position.

Figure 9A:
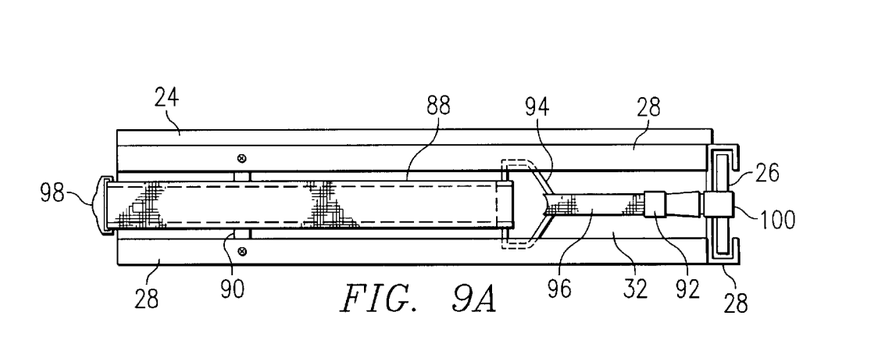

An alternative mounting strap configuration and locking mechanism is shown in FIG. 9A. The carrying strap 88 is looped around an aluminum bar 90 secured in the external channel 28 of the side member 32. A binding post 92 is secured in the external channel 28. The end of the strap 88 is selectively secured to the binding post 92 by a D-ring 94 and an elastic band 96 made from rubber or other similar material. When the elastic band 96 is secured to the binding post 92, the carrying strap 88 remains adjacent the drawer 20 in a brief case-type carrying configuration. When the elastic band 96 is detached from the binding post 92, the looped carrying strap 88 may be pulled through the external channel 28 until the D-ring engages the bar 90. In the detached position, the carrying strap 88 may be extended away from the workstation and be used as a shoulder harness to carry the workstation. A latch 98 may be used in connection with the carrying strap 88 so that the strap 88 can be unlatch to facilitate the movement of the drawer 20 to an open position.

The alternative configuration shown in FIG. 9A also includes an aluminum travel clip 100 pivotably mounted to the binding post 92. The clip 100 can be rotated to extend across the external channel 28 of the cross member 30 to retain the mounting bars 26 in the external channel 28 during travel of the workstation. The clip 100 can be pivoted away from the mounting bars 26 when the bars 26 are extended for mounting on the rack 12.

Figure 10:
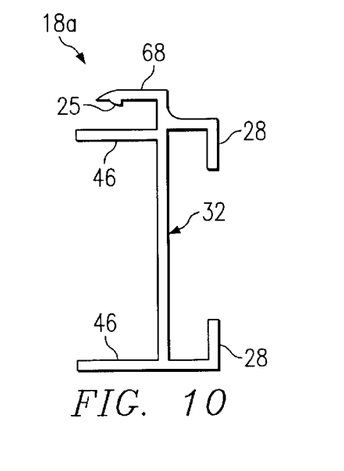
FIG. 10 is an end view of an alternative extrusion used to form the frame, such configuration having an additional channel for securing the cover which forms the work surface.

FIGS. 10–11 show an alternative frame configuration 18a with an additional internal channel 68 formed to retain the cover 24. The configuration of the external channel 28 and the internal channel 46 in alternative frame 18a are similar to the configuration used in frame 18. The cover 24 is slid into the channel 68 and is secured in place in the frame 18a. The channel 68 can provide a smoother outer edge compared to an outer edge of the cover 24, so there is less likelihood of damaging a fiber optic cable 16. There is no change in the functioning of the bars 26 in the external channel 28 of the cross member 30.

As shown in FIGS. 10–11, the frame 18a may also include a small retention flange 25 formed in cover channel 68 for insertion into the corresponding cover groove 25a formed along the outer edges in the top surface of the cover 24. This flange and groove configuration provides a very secure mounting of the cover 24 on the frame 18.

When mounting the workstation 10 on telecommunication racks 12, the preferred positioning of the mounting bars 26 is to insert both bars 26 in the external channel 28 of the cross member 30. However, use of the workstation for other applications, such as ladders, pedestals, or other stationary field stands, may require alternative mounting configurations. For ladders and other field stations which have cross members, an adapter kit may be provided for each of the mounting bars 26.

Figure 12:
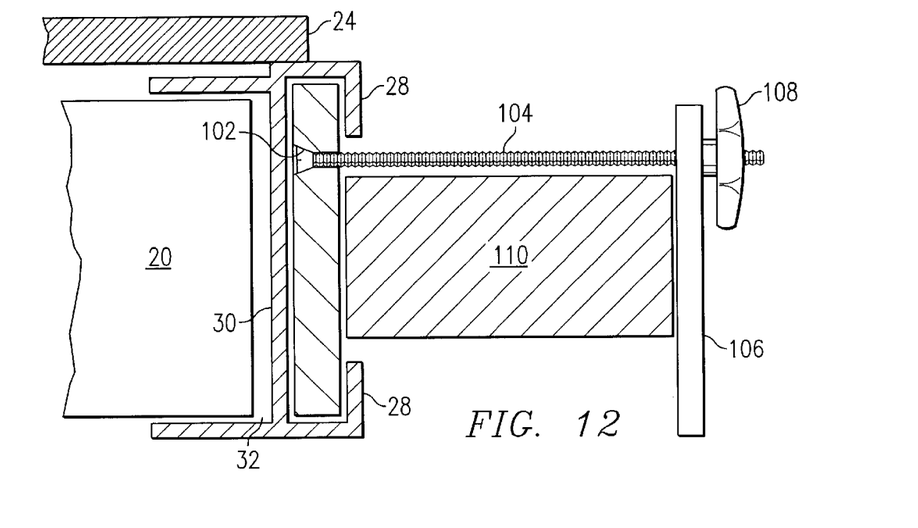
FIG. 12 is a side view of an adapter mounted on the workstation for securing the workstation on a ladder, with the mounting bars and frame shown in cut away view.

As shown in FIG. 12, the mounting bar 26 includes a counter sink hole 102 drilled through the bar 26. The adapter kit consists of an elongated screw 104, a mounting bracket 196 and a screw-on handle 108. The elongated screw 104 is positioned in the counter sink hole 102 such that the head of the screw 104 is recessed within the bar 26. The mounting bracket 106 may then be slid onto the elongated screw 104. A screw-on handle 108 is then screwed on until the mounting bracket 106 is tightly engaging the object on which the frame 18 is mounted, such as the ladder cross member 110 shown in FIG. 12. The cross member is secured between the mounting bars 26 and external channel 28 on one side and the mounting brackets 26 on the other side.

At least two adapter kits are required for mounting the workstation to a ladder or other similar field stand. Other configurations of the mounting bracket 106 may be used. A flange or other hooking-type configuration may be used to mounting bracket 106 to ensure that the workstation is firmly secured. The mounting bracket 106 may be coated with a rubber coating or other non-slip coating to further improve the mounting.

When constructing the workstation 10, using the same channel configuration for both the cross member 30 and the side members 32 provides certain efficiencies in manufacturing the frame 18. The extruding of the frame material and the formation of the frame 18 are the most important steps in the manufacturing process. After the frame is formed, the cover 24 is secured to the frame 18. The insertion of the drawer 20 and the mounting bars 26 in the frame 18 complete the formation of the basic workstation 10.

Figure 13:
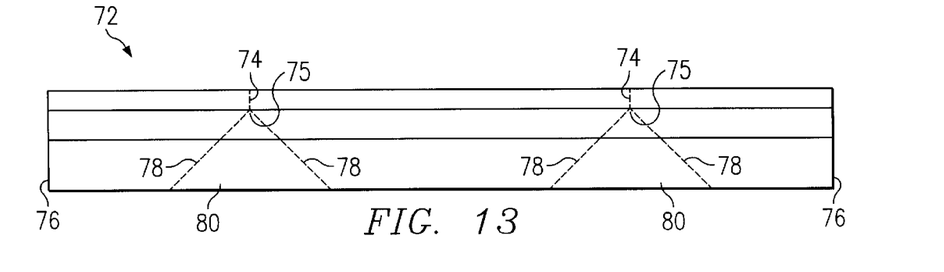
FIG. 13 is a top plan view of the extended extrusion before cutting and welding to form the frame of the workstation.

Aluminum can be extruded in long pieces with the appropriate channels for the frame 18 or frame 18*a*. The extruded aluminum is then cut into appropriate length pieces 72 as shown in FIG. 13 to accommodate various size workstations. The preferred length of the extruded aluminum pieces 72 is 42–48 inches. The piece 72 of aluminum is then cut as shown in the top plan view of FIG. 13. The external channel is saw cut along line 74 to the vertical wall 75. The cut 74 occurs in two places at equal distance from the ends 76. Then four bevel cuts, to the vertical wall 75, are performed along lines 78 and the miters 80 are removed. After the six cuts are completed, the piece 72 is bent in two places and welded to form miter joints at the corners 44. The vertical wall 75 has not been cut and remains intact to provide a strong corner. The edges of the miter joint in corner 44 are welded along the lines shown in FIG. 4. Such frame construction with strong corners provides a sturdy workstation 10, and the frame is capable of supporting the weight in the drawer 20 and cover 24 as well as live loads up to 100 pounds, even when the frame 18 is mounted on the rack 12. Such frame construction method is much stronger than cutting three separate pieces of metal to form the cross member and the two side members and then welding the three pieces together.

After the frame 18 is formed, the cover 24 is attached to the frame 18. As noted above, the frame can be epoxied to the upper surface of the frame 18. If the frame 18*a* is used with the second internal channel 68, the cover 24 is inserted into the channel 68 to secure the cover 24. The mounting bars are then inserted into the external channel 28 and the drawer 20 is inserted into the internal channel 46, which completes the main steps of the formation process. Additional accessories, such as support lines, retention clips, foam inserts, and a handle strap may be added to the workstation as discussed above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A portable workstation for mounting on a rack or other structure, said workstation comprising:
    a drawer having a base, a front wall, a back wall, and opposing side walls for forming a storage area having a top aperture;
    a frame having spaced apart side members with internal mounting tracks for slidably retaining the side walls of said drawer such that the drawer is movable between a closed position and an open position;
    a cover having a flat outer surface and being secured to said frame such that the aperture of the drawer is covered in the closed position;
    a mounting mechanism attached to said frame for securing said frame to a rack structure, whereby when said frame is mounted on the structure, said drawer is movable between the closed position and the open position, and said cover provides a work surface;
    a retention mechanism for selectively retaining the drawer in a closed position, said retention mechanism including a strap extending between the side members for selectively engaging the front wall of said drawer, said strap also providing a handle mechanism for carrying the portable workstation when not mounted on the rack structure.

2. A portable workstation for mounting on a rack or other structure, said workstation comprising:
    a drawer having a base, a front wall, a back wall, and opposing side walls for forming a storage area having a top aperture;
    a U-shaped frame having spaced apart side members and a cross member extending between the side members, said side members including internal mounting tracks for slidably retaining the side walls of said drawer such that the drawer is movable between a closed position and an open position;
    a cover having a flat outer surface and being secured to said frame such that the aperture of said drawer is covered in the closed position;
    an adjustable mounting mechanism attached to the cross member of said frame for selectively securing said frame to a rack structure, such that when said frame is mounted on the structure, said drawer is movable between the closed position and the open position, and said cover provides a horizontal work surface.

3. The portable workstation defined in claim 2, including at least one foam sheet positioned in said drawer in parallel relationship to the base of said drawer, said foam sheet having cutouts formed in said foam sheet to form a plurality of storage areas.

4. The portable workstation defined in claim 2, including at least one foam sheet positioned in said drawer in parallel, spaced-apart relationship to the base of said drawer, said foam sheet having cutouts formed in said foam sheet, whereby storage areas are formed on both sides of said foam sheet.

5. The portable workstation defined in claim 2, wherein said cover is made from PVC material.

6. The portable workstation defined in claim 2, wherein said side members include an internal channel formed parallel to said mounting tracks for retaining said cover.

7. A portable workstation for mounting on a rack or other structure, said workstation comprising:

a drawer having a base, a front wall, a back wall, and opposing side walls for forming a storage area having a top aperture;

a U-shaped frame having spaced apart side members and a cross member extending between the side members, said side members including internal mounting tracks for slidably retaining the side walls of said drawer such that the drawer is movable between a closed position and an open position, and said frame including an external channel formed in the cross member and the side members;

a cover having a flat outer surface and being secured to said frame such that the aperture of said drawer is covered in the closed position;

a pair of mounting bars slidably retained in the external channel of said U-shaped frame for adjustably mounting and securing said frame to a rack structure, such that when said frame is mounted on the structure, said drawer is movable between the closed position and the open position, and said cover provides a horizontal work surface.

8. The portable workstation defined in claim 7 including a retention strap extending between the side members for selectively engaging the front wall of said drawer, said strap also providing a handle mechanism for carrying the portable workstation when not mounted on the rack structure.

9. The portable workstation defined in claim 7, wherein said mounting bars include a keyhole formed in each of the mounting bars.

10. The portable workstation defined in claim 7, wherein said side members and said cross member include an internal channel for retaining said cover.

11. A portable workstation for mounting on a rack or other structure, said workstation comprising:

a drawer having a base, a front wall, a back wall, and opposing side walls for forming a storage area having a top aperture;

a U-shaped frame having spaced apart side members and a cross member extending between the side members, said cross member including an external channel and said side members including internal mounting tracks for slidably retaining the side walls of said drawer such that the drawer is movable between a closed position and an open position;

a cover having a flat outer surface and being secured to said frame such that the aperture of said drawer is covered in the closed position;

a pair of adjustable mounting bars slidably positioned in the external channel at opposite ends of the cross member, the mounting bars being adjustable between a mounting position with the bars partially extending from the external channel of the cross member and a carrying position with the bars being retained within the external channel, whereby when said frame is mounted on a rack structure, said drawer is movable between the closed position and the open position, and said cover provides a horizontal work surface.

12. The portable workstation defined in claim 11, wherein said mounting bars include a keyhole formed in each of the mounting bars, wherein the keyholes are positioned outside of the external channel when the mounting bars are in the mounting position, the keyholes being in spaced-apart relationship to facilitate the mounting of the frame on the rack structure.

13. The portable workstation defined in claim 12, wherein the key holes are formed at a forty-five degree biased offset configuration in said mounting bars.

14. The portable workstation defined in claim 11, including a latching mechanism mounted on each of the side members and selectively securable across the ends of the external channel of the cross member when the mounting bars are in the carrying position, whereby the mounting bars may be secured in the external channel when the workstation is being transported.

15. The portable workstation defined in claim 11, including an adapter plate adjustably connected to each of said mounting bars when the mounting bars are in the mounting position, the adapter plate and mounting bars being positioned in parallel spaced-apart relationship.

16. The portable workstation defined in claim 15, including an elongated screw extending perpendicular from each of said mounting bars and adjustably connected to the adapter plate.

* * * * *